(12) United States Patent
Varnoux et al.

(10) Patent No.: US 8,864,385 B2
(45) Date of Patent: Oct. 21, 2014

(54) ROLLING BEARING COMPRISING A SEALING GASKET AND AN ANNULAR SHIELD

(75) Inventors: Laurent Varnoux, Saint Avertin (FR); Thomas Perrotin, Saint Roch (FR)

(73) Assignee: Aktiebolaget SKF, Gothehburg (SE)

( * ) Notice: Subject to any disclaimer, the term of this patent is extended or adjusted under 35 U.S.C. 154(b) by 0 days.

(21) Appl. No.: 13/639,063

(22) PCT Filed: Apr. 2, 2010

(86) PCT No.: PCT/IB2010/001276
§ 371 (c)(1),
(2), (4) Date: Dec. 18, 2012

(87) PCT Pub. No.: WO2011/121385
PCT Pub. Date: Oct. 6, 2011

(65) Prior Publication Data
US 2013/0287329 A1    Oct. 31, 2013

(51) Int. Cl.
*F16C 33/76* (2006.01)
*F16J 15/34* (2006.01)
*F16C 33/78* (2006.01)

(52) U.S. Cl.
CPC ............ *F16C 33/76* (2013.01); *F16J 15/3456* (2013.01); *F16C 33/7859* (2013.01)
USPC ............................ 384/486; 384/478; 384/485

(58) Field of Classification Search
USPC .................. 384/464–486; 277/353, 551, 562, 277/572–577
See application file for complete search history.

(56) References Cited

U.S. PATENT DOCUMENTS

| | | | | |
|---|---|---|---|---|
| 3,519,316 A | * | 7/1970 | Gothberg | 384/486 |
| 4,639,149 A | * | 1/1987 | Bras et al. | 384/477 |
| 4,792,242 A | | 12/1988 | Colanzi et al. | |
| 5,022,659 A | * | 6/1991 | Otto | 277/309 |
| 5,419,642 A | | 5/1995 | McLarty | |
| 5,560,715 A | * | 10/1996 | Mosby | 384/477 |
| 5,695,290 A | | 12/1997 | Mondak et al. | |
| 6,042,272 A | | 3/2000 | Nagase | |
| 2008/0166078 A1 | | 7/2008 | Niebling et al. | |

FOREIGN PATENT DOCUMENTS

| | | |
|---|---|---|
| EP | 0388258 A1 | 9/1990 |
| EP | 1316736 A2 | 6/2003 |
| JP | 2009216139 A * | 9/2009 |

* cited by examiner

*Primary Examiner* — Phillip A Johnson
(74) *Attorney, Agent, or Firm* — Bryan Peckjian; SKF USA Inc. Patent Department

(57) ABSTRACT

This rolling bearing comprises an outer ring (4), an inner ring (6), rolling bodies (10) arranged between the outer ring and the inner ring, one a sealing gasket (20) mounted on a first ring (4) and extending towards the second ring (6), to the extent that a sealing edge (26) of said sealing gasket is in sliding contact with the second ring. An annular shield (50) is mounted on the second ring (62) and extends radially towards the first ring (4). This shield (50) is provided with at least one annular lip (58) in sliding contact with a lateral face (28) of the sealing gasket (20).

16 Claims, 6 Drawing Sheets

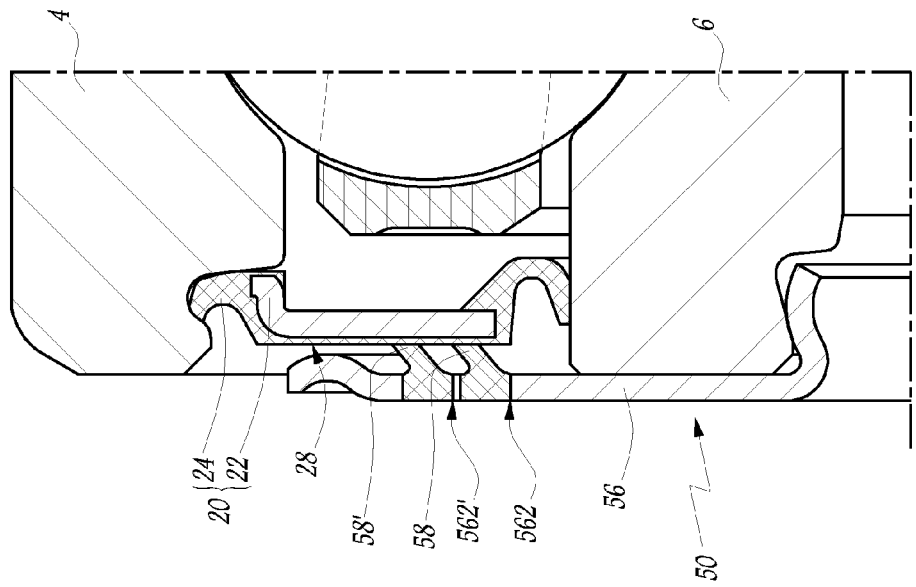
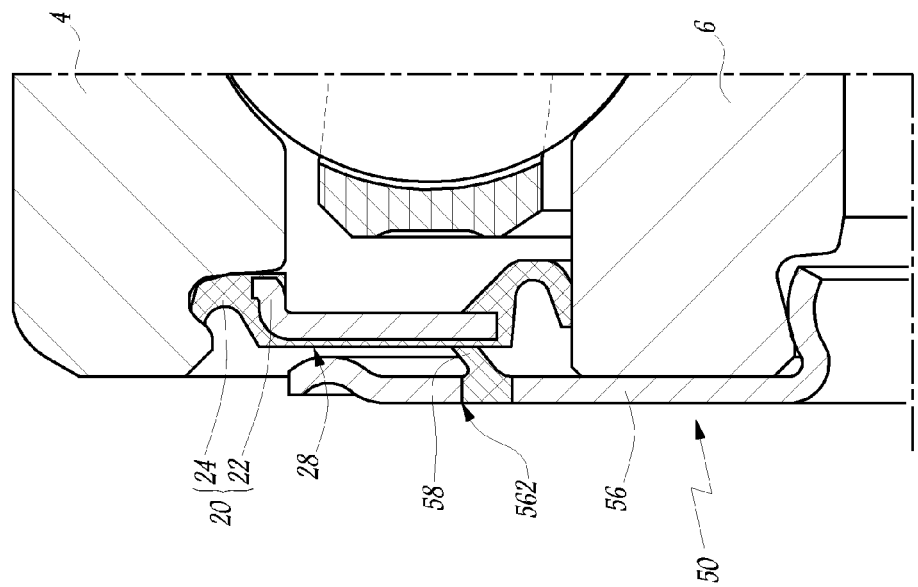

ROLLING BEARING COMPRISING A SEALING GASKET AND AN ANNULAR SHIELD

CROSS-REFERENCE

This application is the U.S. national stage of International Application No. PCT/IB2010/001276 filed on Apr. 2, 2010, which is herein incorporated by reference in its entirety.

TECHNICAL FIELD OF THE INVENTION

This invention relates to a rolling bearing comprising, amongst others, a sealing gasket mounted on the outer ring or on the inner ring of the bearing and extending towards the inner ring or the outer ring with which it is in sliding contact.

BACKGROUND OF THE INVENTION

A rolling bearing comprises an inner ring, an outer ring and several rolling bodies installed between these two rings. These rolling bodies can be balls, rollers or needles. In the sense of the present invention, a rolling bearing can be, for instance, a ball bearing, a roller bearing or a needle bearing.

EP-A-1 316 736 discloses a rolling bearing comprising a sealing gasket extending between an inner ring and an outer ring of the bearing. In this bearing, an annular shield is used, on each side of the rolling bearing, to protect a contact zone between the sealing gasket and the inner ring. Such a shield avoids that stones or water impact the sealing gasket in this contact zone. However, dust or water can still penetrate in the space defined between the shield and the gasket, which might induce pollution of the contact zone.

SUMMARY OF THE INVENTION

This invention aims at improving the known devices in order to improve their tightness, while a standard sealing gasket can be used.

To this end, the invention concerns a rolling bearing comprising an outer ring, an inner ring, rolling bodies arranged between the outer ring and the inner ring, at least one sealing gasket mounted on a first ring between the outer ring and the inner ring and extending towards the second ring, to the extent that a sealing edge of the sealing gasket is in sliding contact with the second ring, and at least one annular shield mounted on the second ring and extending radially towards the first ring. According to the invention, the shield is provided with at least one annular lip in sliding contact with a lateral face of the sealing gasket.

Thanks to the invention, pollution, such as liquids or particles, is prevented from entering the space between the shield and the sealing gasket, next to the contact zone between the sealing edge of the sealing gasket and the second ring.

In the present description, the words "axial", "radial", "axially", "radially", "centrifugal", "centripetal" and similar words relate to the axis of rotation of the one ring of the rolling bearing with respect to the other ring. A direction is "axial" when it is parallel to this axis and "radial" when it is perpendicular and secant to this axis. A surface is "axial" when it is perpendicular to this axis and "radial" when it surrounds this axis and when a direction perpendicular to this surface is radial.

According to further aspects of the invention, which are advantageous but not compulsory, the rolling bearing of the invention might incorporate one or several of the following features:

The first ring is the outer ring and the second ring is the inner ring. Alternatively, the first ring is the inner ring and the second ring is the outer ring.

The shield can be metallic or made in a synthetic material, such as a polymer or an elastomer.

The annular lip is integral with a main body of the shield. Alternatively, the annular lip is fastened to a lateral face of a main body of the shield, e.g. by gluing, welding, vulcanization or clipping. According to a third approach, the annular lip can be over-molded onto a main body of the shield. In this case, the main body is advantageously provided with several through holes and the annular lip is over-molded in these through holes.

The sealing gasket has an armature and a flexible fitting forming the sealing edge and this fitting has a window giving access to a zone of this armature, which receives the annular lip in sliding contact.

The sealing gasket is provided with an annular lip in sliding contact with the shield.

The shield is provided with two annular lips in sliding contact with the sealing gasket. In such a case, these annular lips can be parallel, or diverge when going away from a main body of the shield, or converge.

The annular lip has a frustroconical shape.

BRIEF DESCRIPTION OF THE DRAWINGS

The invention will be better understood on the basis of the following description which is given in correspondence with the annexed figures and as an illustrative example, without restricting the object of the invention. In the annexed figures:

FIGS. 3 to 10 are detailed views similar to FIG. 2 for some other embodiments of the invention.

DETAILED DESCRIPTION OF SOME EMBODIMENTS

Figure 2:
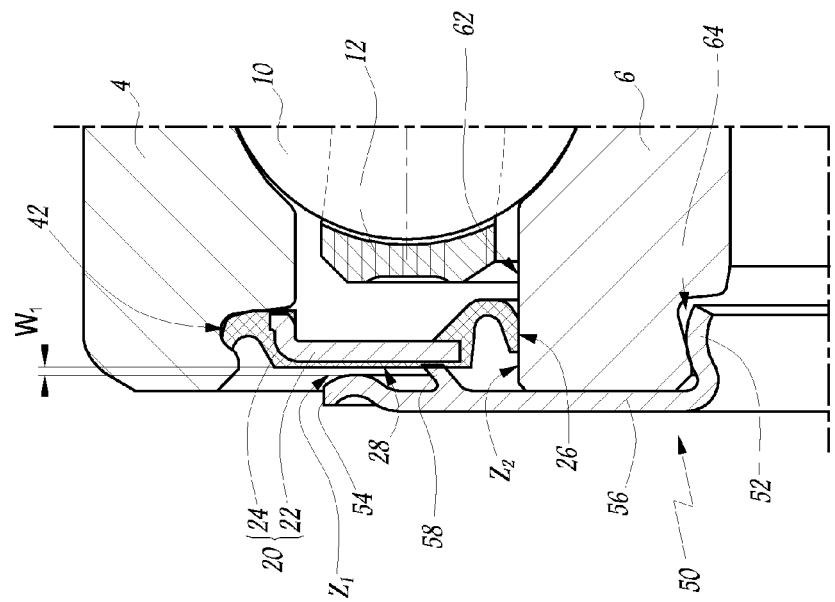
FIG. 2 is an enlarged view of detail II on FIG. 1.
Figure 1:
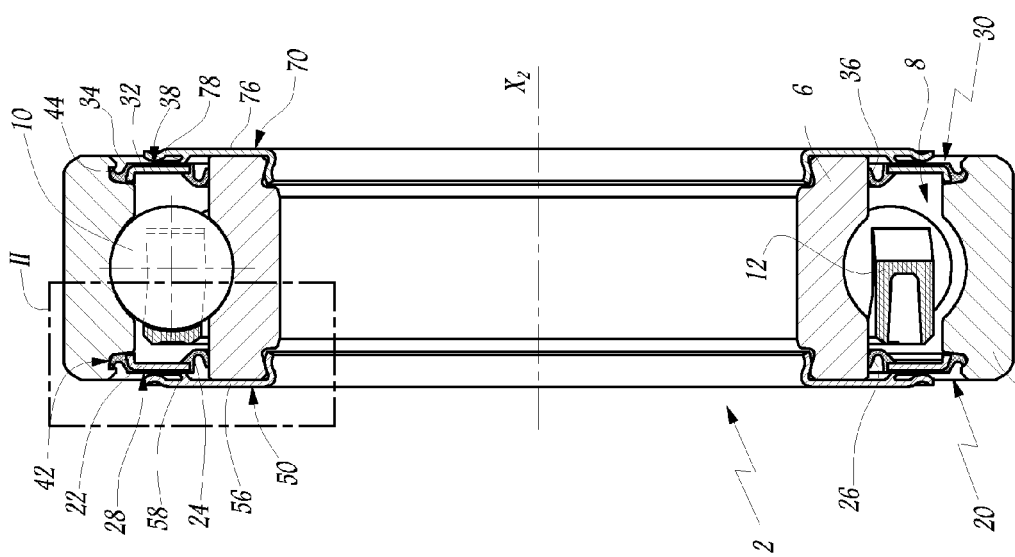
FIG. 1 is a sectional view of a rolling bearing according to the invention.
Figure 4:
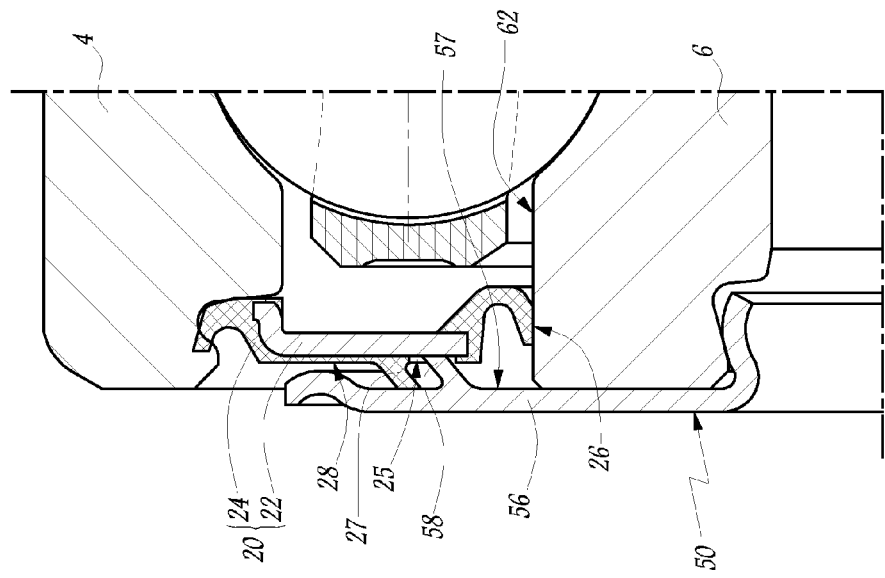
Figure 3:
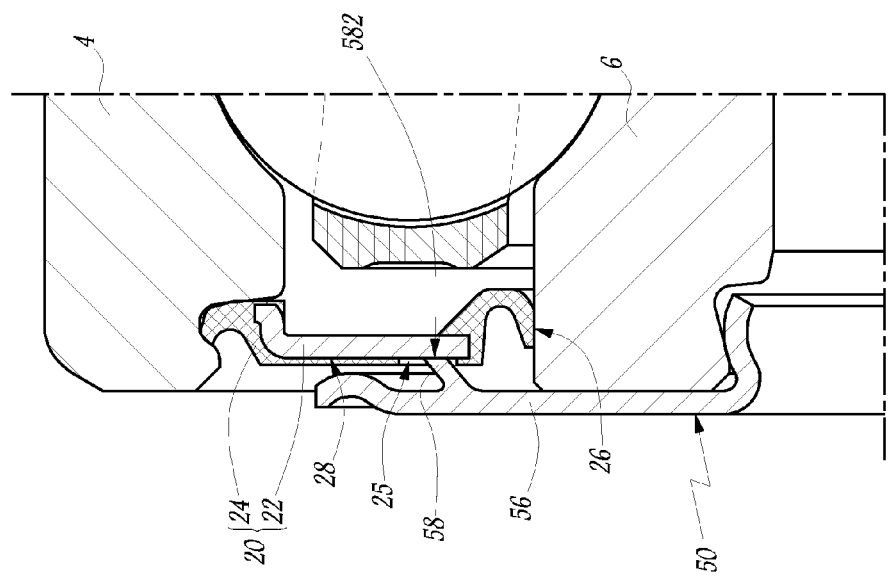

FIG. 1 depicts a ball bearing 2 comprising an outer ring 4 and an inner ring 6 defining between them a chamber 8 where a single set of balls 10 is installed and held in position by a cage 12. Outer ring 4 is fast in rotation and inner ring 6 rotates with respect to outer ring 4, around a central axis $X_2$ of ball bearing 2.

Two sealing gaskets 20 and 30 are mounted on outer ring 4 and extend towards inner ring 6. More precisely, outer ring 4 is provided with two grooves 42 and 44 where a part of sealing gaskets 20 and 30 is wedged.

Sealing gasket 20 is made of a metallic armature 22 and an elastomeric fitting 24 which surrounds armature 22 and forms a sealing edge 26 which is in sliding contact with the outer radial surface 62 of inner ring 6.

Sealing gasket 30 is identical to sealing gasket 20 and also includes an armature 32 and a fitting 34 defining a sealing edge 36.

Two annular shields 50 and 70 are mounted on inner ring 6 and adapted to protect sealing gaskets 20 and 30 from shocks, e.g. from stones arriving from the outside, and from humidity, in particular water. Shields 50 and 70 more particularly protect sealing edges 26 and 36 and surface 62, that is the sliding contact zones between sealing gaskets 20 and 30 and inner ring 6.

Shields 50 and 70 are identical.

Shield 50 has an inner radial bended portion 52 adapted to be blocked within an inner peripheral groove 64 of inner ring 6 in order to hold shield 50 with respect to inner ring 6. Shield 50 also has an outer radial portion 54 which is outwardly concave and inwardly convex, when considered with respect to chamber 8.

Between portions 52 and 54, shield 50 is flat and forms a main body 56 which is integral with portions 52 and 54.

The shape of outer radial portion 54 defines with an external lateral face 28 of sealing gasket 20 an entry zone $Z_1$ to the annular volume defined between items 20 and 50. Face 28 is an axial face of gasket 20. The arcuate shape of outer radial portion 54 implies that the minimum axial width $W_1$ of zone $Z_1$ is small, as compared to the other dimensions of rolling bearing 2. This small width $W_1$ of zone $Z_1$ prevents most contaminants from entering the annular space between items 50 and 70 and from reaching the contact zone $Z_2$ between edge 26 and surface 62. The arcuate shape of outer portion 54 also allows shield 50 to eject contaminants by means of a centrifugal or "ventilator" effect due to its rotation around axis $X_2$.

Shield 50 is provided with an annular lip 58 which is frustroconical and is in sliding contact with external lateral face 28 of sealing gasket 20. Annular lip 58 prevents contaminants that could penetrate between items 20 and 50 via entry zone $Z_1$ to reach the contact zone $Z_2$ between sealing edge 26 and surface 62.

Thus, an auxiliary sealing function is obtained between sealing gasket 20 and shield 50 without modifications to sealing gasket 20. This gasket can thus be standard product, which can be manufactured in large quantities and have a low cost.

Similarly, shield 70 is provided with an annular sealing lip 78 which is in sliding contact with the external lateral axial face 38 of sealing gasket 20.

Shields 50 and 70 are metallic. Alternatively, shields 50 and 70 can be made in a synthetic material, for instance plastics, such as a polymer, e.g. PA 4.6 or PA 6.6 which may be or may not be reinforced with glass fibers or PEEK. One can also use an elastomer to build the shields. This applies to all embodiments.

Annular lips 58 and 78 are integral with the main bodies 56 and 76 of the shields 50 and 70.

In the second to ninth embodiments of the invention represented on FIGS. 3 to 10, the elements similar to the ones of the first embodiment have the same references. Hereafter, one describes mainly the differences between the second to ninth embodiments and the first embodiment. Unless otherwise specified, the second to ninth embodiments work as the first embodiment.

In the second embodiment, shield 50 is identical to the first embodiment and the fitting 24 of the sealing gasket 20 defines a window 25 which allows direct contact between the free edge 582 of annular lip 58 and armature 22. This metal/metal contact avoids damages to fitting 24.

In the third embodiment of the invention, shield 50 is identical to the one of the first embodiment and fitting 24 of sealing gasket 20 is provided with a window 25, as in the second embodiment. Fitting 24 also forms an annular lip 27 which is in sliding contact against the internal lateral axial face 57 of shield 50, so that a double sealing contact is obtained, respectively between annular lip 58 and armature 22 and between annular lip 27 and main body 56 of shield 50. This embodiment requires sealing gasket 20 to be specifically designed for this function, which is not the case for most of the other embodiments.

In the embodiment of FIG. 5, annular lip 58 is obtained by overmolding an elastomeric annular lip 58 over the main body 56 of the shield 50. In this case, sealing gasket 20 is identical to the one of the first embodiment. Actually, through holes 562 are regularly made through main body 56, around the central axis of shield 50, and they serve as anchoring means for annual lip 58. This construction allows the contact between shield 50 and sealing gasket 20 to be made between two elastomeric parts, namely annular lip 58 and fitting 24.

In the embodiment of FIG. 6, shield 50 is provided with two sealing lips 58, 58' which are parallel and come into sliding contact with the same lateral axial face 28 of sealing gasket 20, this lateral face being constituted by the elastomeric fitting 24. These two annular lips 58 and 58' are made by overmolding some elastomer into through holes 562, 562' of the main body 56 of shield 50, as in the embodiment of FIG. 5.

Figure 7:
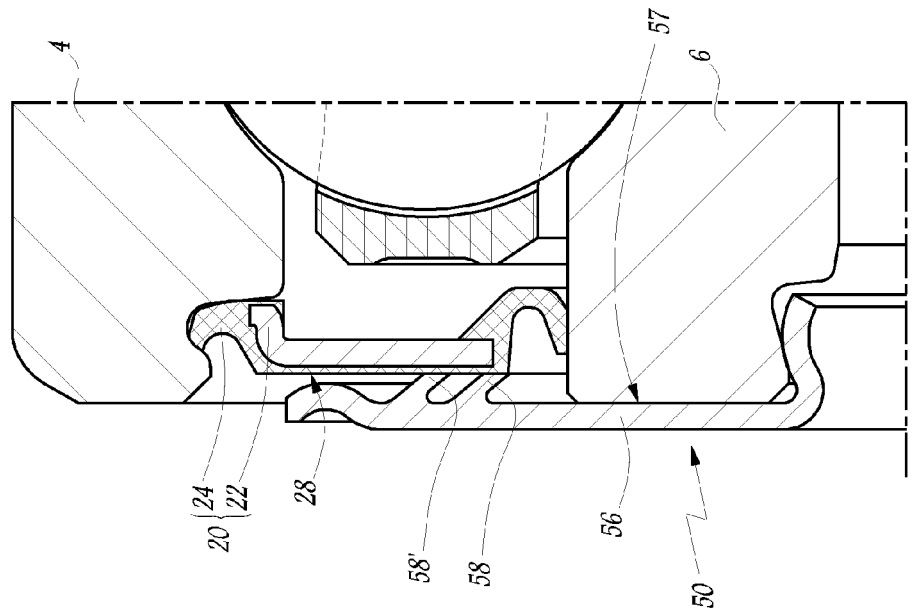

In the embodiment of FIG. 7, two lips 58 and 58' made of plastic material are glued onto the main body 56 of shield 50 which is also made of plastic. Lips 58 and 58' come into sliding contact with the lateral axial face 28 of sealing gasket 20. Alternatively, annual lips 58 and 58' could be vulcanized or welded onto body 56. Alternatively, these two lips can also be integral with the main body, as the single lip 58 of the first embodiment.

In the first six embodiments of the invention, the annular lip or lips 58 and 58' born by the shield 50 extend towards ring 4 when going away from the internal face 57 of shield 50.

Figure 8:
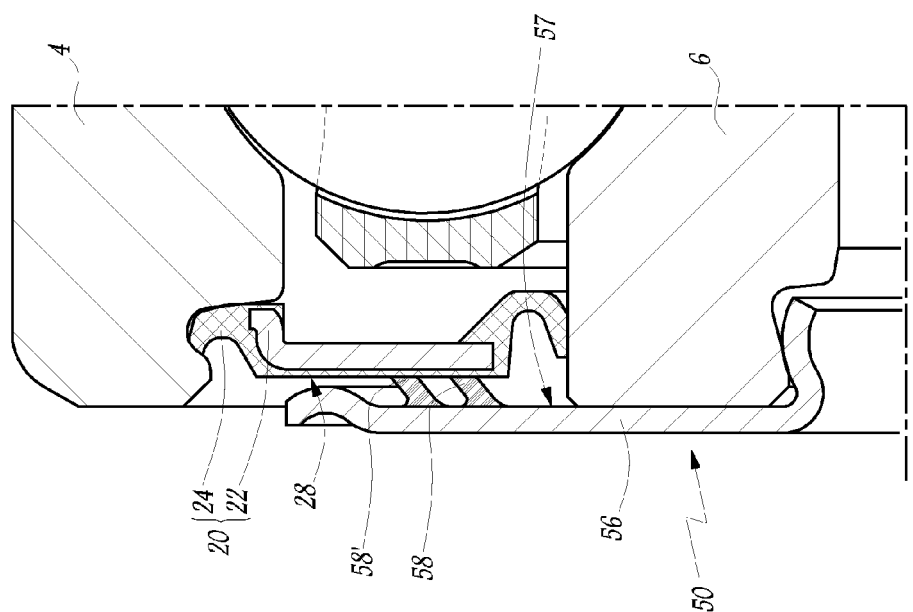

In the embodiment of FIG. 8, the two annular lips 58 and 58', which are integral with the main body 56 of the shield 50, extend toward inner ring 6 when going away from internal lateral axial face 57 of main body 56.

In the embodiments of FIGS. 6, 7 and 8, sealing lips 58 and 58' are parallel.

Figure 9:
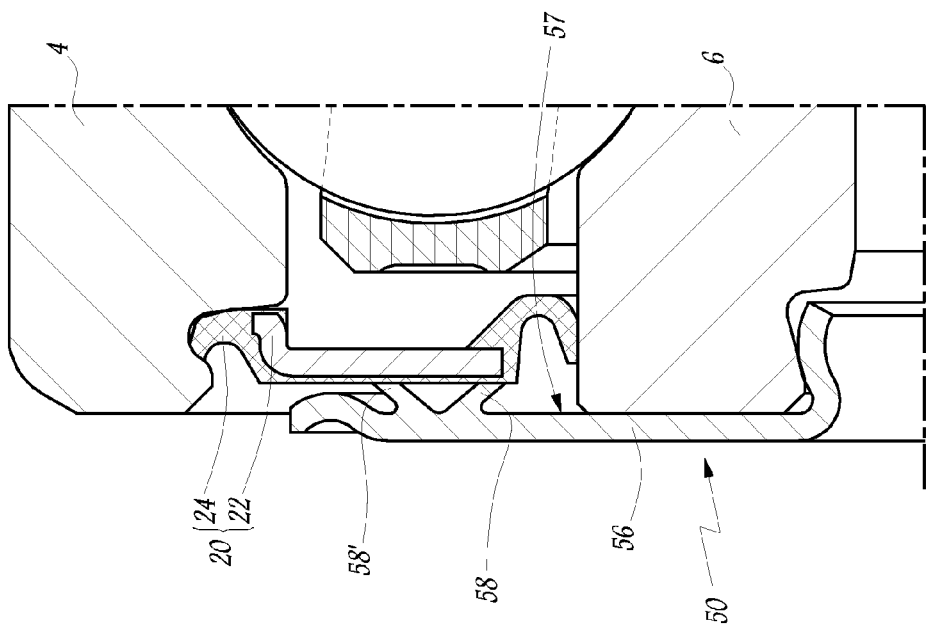

In the embodiment of FIG. 9, the annular lips 58 and 58' diverge when going away from the internal lateral axial face 57 of shield 50. More particularly, annular lip 58 which is closer to inner ring 6 is oriented towards this ring, whereas annular lip 58' which is closer to outer ring 4 is oriented towards this ring.

Figure 10:
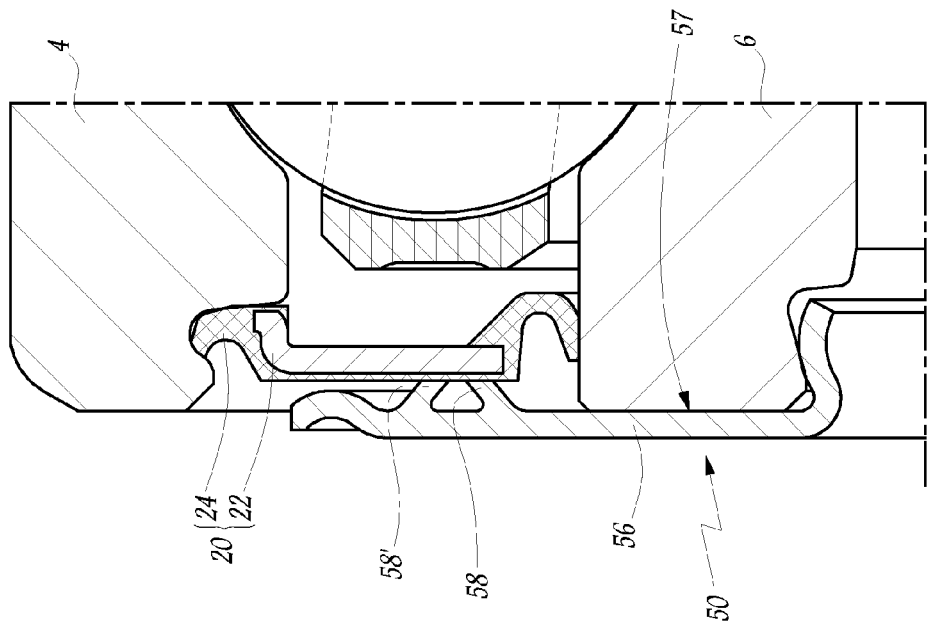

In the embodiment of FIG. 10, annular lips 58 and 58' converge when going away from the internal face 57 of shield 50. In other words, annular lip 58 which is closer to inner ring 6 is oriented towards outer ring 4, whereas annular lip 58' which is closer to outer ring 4 is oriented towards inner ring 6.

Figure 11:
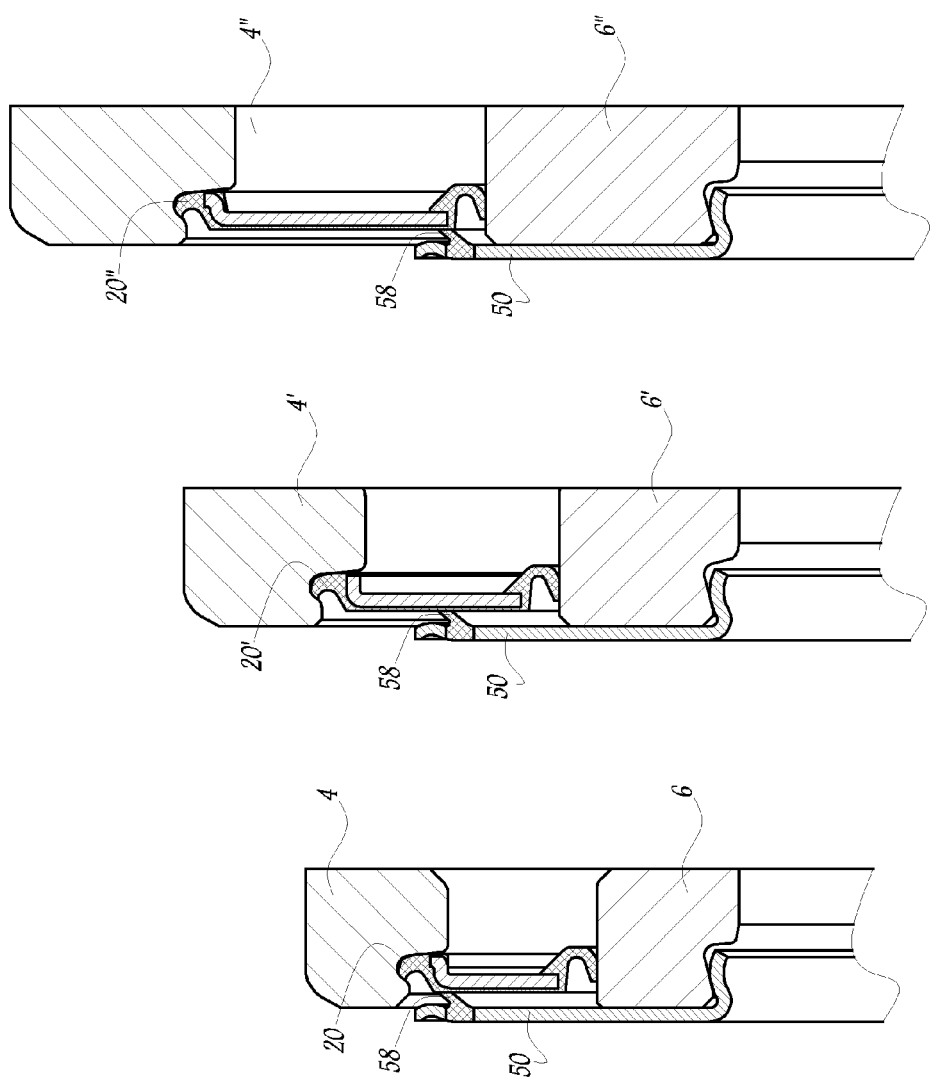
FIG. 11 is a schematic view showing how one shield can be used in different configurations.

As shown on FIG. 11, the same shield 50 can be mounted on three inner rings 6, 6' and 6" of rolling bearings having different respective radial thicknesses, so that the lip 58 of this shield can interact with sealing gaskets 20, 20' and 20" mounted on outer rings 4, 4' and 4". The sealing gaskets 20, 20' and 20" shown on FIG. 11 have different sizes and the sealing lip 58 of shield 50 can cooperate with these different gaskets, at different locations on the lateral faces 28, 28' and 28" of the gaskets. The respective configurations of FIG. 11 are shown with the shield of FIG. 5. They can be obtained with the shields of the other embodiments.

According to alternative embodiments of the invention, sealing gasket 20 and 30 can be mounted on inner ring 6 of roll bearing 2 and in sliding contact, by their edges 26 or 36 with outer ring 4. In such a case, the shields 50 and 70 are mounted on the outer ring 4. According to the invention, they are provided with annular lips which are in sliding contact against the lateral external axial faces 28 and 38 of the sealing gasket.

In the embodiments of FIGS. 2 to 10, the shield has an arcuate outer radial portion similar to position 54 of the first embodiment.

The technical features of the embodiments considering above can be combined.

The invention claimed is:

1. A rolling bearing comprising:
an outer ring,
an inner ring,
rolling bodies arranged between the outer ring and the inner ring,
at least one sealing gasket mounted on a first one of said outer ring and said inner ring and extending towards a second one of said outer ring and said inner ring, such that a sealing edge of said sealing gasket is in sliding contact with the second one of said outer ring and said inner ring,
at least one annular shield mounted on said second one of said outer ring and said inner ring and extending radially towards said first one of said outer ring and said inner ring, and wherein
said shield is provided with one and only one annular lip and wherein said one and only one annular lip is in sliding contact with a radially extending portion of a lateral face of said sealing gasket.

2. The rolling bearing according to claim 1, wherein said at least one sealing gasket is mounted on said outer ring and said at least one annular shield is mounted on said inner ring.

3. The rolling bearing according to claim 1, wherein said shield is metallic.

4. The rolling bearing according to claim 1, wherein said shield is made of a polymer or an elastomer.

5. The rolling bearing according to claim 1, wherein said one and only one annular lip is integral with a main body of said shield.

6. The rolling bearing according to claim 1, wherein said one and only one annular lip is fastened to a lateral face of a main body of said shield by gluing, welding, vulcanization or clipping.

7. The rolling bearing according to claim 1, wherein said one and only one annular lip is over-molded onto a main body of said shield.

8. The rolling bearing according to claim 1, wherein said sealing gasket is provided with an annular lip in sliding contact with said shield.

9. The rolling bearing according to claim 1 wherein said one and only one annular lip has a frustoconical shape.

10. The rolling bearing according to claim 1, wherein the rolling bearing has an axis of rotation and wherein said radially extending portion of the lateral face of the sealing gasket lies in a plane perpendicular to the rotational axis of the rolling bearing.

11. A rolling bearing comprising:
an outer ring,
an inner ring,
rolling bodies arranged between the outer ring and the inner ring,
at least one sealing gasket mounted on a first one of said outer ring and said inner ring and extending towards a second one of said outer ring and said inner ring, such that a sealing edge of said sealing gasket is in sliding contact with the second one of said outer ring and said inner ring,
at least one annular shield mounted on said second one of said outer ring and said inner ring and extending radially towards said first one of said outer ring and said inner ring, and wherein
said shield includes a main body and is provided with at least one annular lip in sliding contact with a lateral face of said sealing gasket, and
wherein said main body is provided with several through holes and said annular lip is over-molded in these through holes.

12. A rolling bearing comprising:
an outer ring,
an inner ring,
rolling bodies arranged between the outer ring and the inner ring,
at least one sealing gasket mounted on a first one of said outer ring and said inner ring and extending towards a second one of said outer ring and said inner ring, such that a sealing edge of said sealing gasket is in sliding contact with the second one of said outer ring and said inner ring,
at least one annular shield mounted on said second one of said outer ring and said inner ring and extending radially towards said first one of said outer ring and said inner ring, and wherein
said shield is provided with at least one annular lip in sliding contact with a radially extending portion of a lateral face of said sealing gasket, and wherein
said sealing gasket has an armature and a flexible fitting forming said sealing edge and wherein said fitting has a window giving access to a zone of said armature which receives said annular lip in sliding contact.

13. A rolling bearing comprising:
an outer ring,
an inner ring,
rolling bodies arranged between the outer ring and the inner ring,
at least one sealing gasket mounted on a first one of said outer ring and said inner ring and extending towards a second one of said outer ring and said inner ring, such that a sealing edge of said sealing gasket is in sliding contact with the second one of said outer ring and said inner ring,
at least one annular shield mounted on said second one of said outer ring and said inner ring and extending radially towards said first one of said outer ring and said inner ring,
wherein said shield is provided with a first annular lip and a second annular lip, and
wherein both said first annular lip and said second annular lip are in sliding contact with a radially extending portion of a lateral face of said sealing gasket.

14. The rolling bearing according to claim 13, wherein said first and second annular lips are parallel.

15. The rolling bearing according to claim 13, wherein said first and second annular lips diverge when going away from a main body of said shield.

16. The rolling bearing according to claim 13, wherein said first and second annular lips converge when going away from a main body of said shield.

* * * * *